United States Patent [19]

Haferl

[11] 3,868,582

[45] Feb. 25, 1975

[54] AF AMPLIFIER HAVING CONSTANT CURRENT CONSUMPTION

[75] Inventor: Peter Eduard Haferl, Adliswil, Switzerland

[73] Assignee: RCA Corporation, New York, N.Y.

[22] Filed: Oct. 9, 1973

[21] Appl. No.: 404,782

[30] Foreign Application Priority Data

Nov. 13, 1972 Great Britain .................... 52362/72

[52] U.S. Cl. ........................ 330/22, 178/5, 178/8 R, 330/17, 330/18, 330/22, 330/23, 330/40

[51] Int. Cl. .............................................. H03f 3/04

[58] Field of Search .......... 179/1 A; 330/13, 15, 17, 330/18, 22, 40

[56] References Cited

UNITED STATES PATENTS

| | | | |
|---|---|---|---|
| 3,668,541 | 6/1972 | Pease | 330/17 |
| 3,683,112 | 8/1972 | Nettleship | 179/1 A |

*Primary Examiner*—Rudolph V. Rolinec
*Assistant Examiner*—Lawrence J. Dahl
*Attorney, Agent, or Firm*—Eugene M. Whitacre; Mason DeCamillis

[57] ABSTRACT

An audio amplifier is provided which draws a substantially constant current from the direct operating voltage source independent of output load requirements. The amplifier is particularly useful in television receivers wherein operating power for the audio amplifier is derived from the deflection system of the receiver.

6 Claims, 1 Drawing Figure

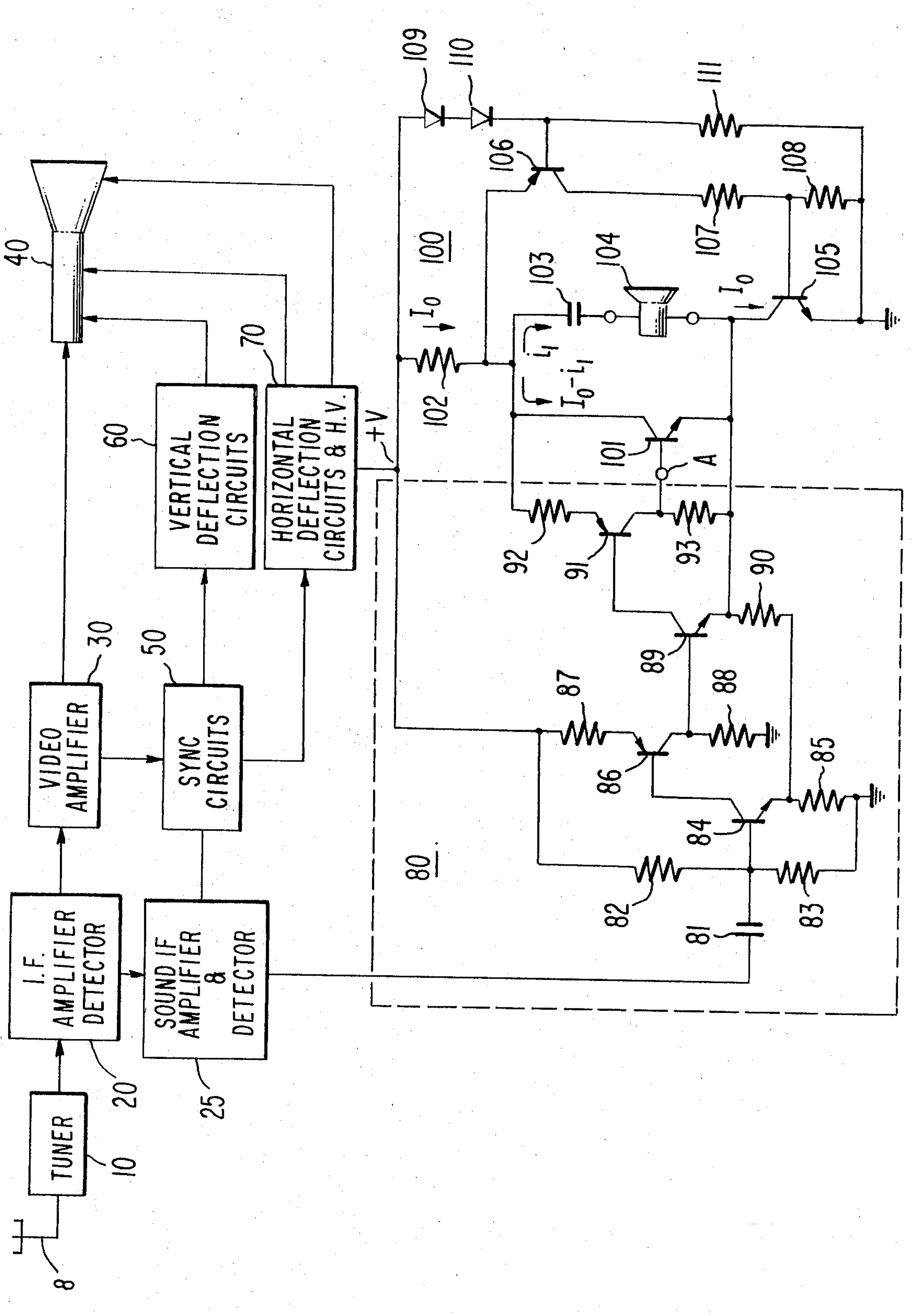
TUNER
I.F. AMPLIFIER DETECTOR
SOUND IF AMPLIFIER & DETECTOR
VIDEO AMPLIFIER
SYNC CIRCUITS
VERTICAL DEFLECTION CIRCUITS
HORIZONTAL DEFLECTION CIRCUITS & H.V.
+V
A

AF AMPLIFIER HAVING CONSTANT CURRENT CONSUMPTION

This invention relates to an audio amplifier having substantially constant current consumption and is particularly useful where the operating voltage supply for the amplifier is derived from the horizontal deflection circuit of a television receiver.

The use of the horizontal deflection system of a television receiver as a source of auxiliary power for other receiver circuitry is known and is especially advantageous in color and black and white television receivers of the type which employ no main low voltage power supply transformer.

Audio amplifier circuits consume a variable amount of power which is dependent upon the nature of the audio signal to be reproduced. Accordingly, where the power for operating such audio circuits is derived from the horizontal deflection circuit of an associated television receiver, the variations in the power drain of the audio circuits may be expected to affect the power available for the deflection circuit itself. Thus, in such a configuration variations in the audio power drain can result in variations in the power available for deflection which will result in variations of the width of the image (raster) produced on the associated cathode ray tube.

Typical prior art solutions to the problem of variable power demand, such as zener diode stabilization of the deflection power supply or increased power supply filtering, add complexity and cost to the receiver making these solutions unattractive.

A circuit constructed in accordance with the principles of the present invention can include an audio amplifier having substantially constant current consumption and is provided for coupling to an auxiliary voltage supply derived from the deflection system of a television receiver. The amplifier has first and second transistors series connected between the terminals of the auxiliary voltage supply. A load in the form of a loudspeaker is coupled across the first transistor. A bias network is provided for biasing the second transistor to establish a substantially constant current consumption by the amplifier independent of the output signal level. Audio signals coupled to the first transistor cause voltage variations corresponding to the audio signals across the load.

Referring to the attached drawing there is shown partly in block form, and partly in schematic circuit form, a television receiver including a preferred embodiment of the invention.

A carrier wave modulated by television signals is coupled via an antenna 8 to television signal receiving and processing circuits which include the customary complement of RF tuner 10, IF amplifier and detector 20, video amplifier 30, synchronization circuits 50, vertical deflection circuit 60 and horizontal deflection circuit 70 coupled to an image reproducer 40. (In the case of a color receiver this complement would include color synchronization and chrominance circuits, not shown).

An output from the IF amplifier 20 is processed in customary fashion in a sound IF amplifier and detector 25 to provide a detected audio signal suitable for reproduction.

The detected output of sound IF amplifier and detector 25 is coupled to an audio preamplifier 80. Preamplifier 80 comprises transistors 84, 86, 89, and 91, each having emitter, base, and collector electrodes. The base electrode of transistor 84 receives the detected sound signals through a coupling capacitor 81. The emitter of transistor 84 is coupled to a point of reference potential, such as ground, by a resistor 85. The collector electrode of transistor 84 is direct coupled to the base electrode of a transistor 86. Bias for transistor 84 is provided by resistors 82 and 83 coupled between a source of voltage +V and ground.

The input base electrode of transistor 86 is direct coupled to the collector of transistor 84 and is biased for proper operation thereby. The emitter of transistor 86 is coupled to the source of operating voltage +V by resistor 87. The collector electrode of transistor 86 is coupled to ground by a resistor 88.

The base electrode of transistor 89 is direct coupled to the junction of the collector electrode of transistor 86 and resistor 88 for receiving an input signal. The emitter electrode of transistor 89 is coupled to the junction of the emitter electrode of transistor 84 and resistor 85 by resistor 90. The collector electrode of transistor 89 is direct coupled to the base electrode of transistor 91 and provides a signal input.

The collector electrode of transistor 91 is coupled to the junction of the emitter electrode of transistor 89 and resistor 90 by means of resistor 93. The emitter electrode of transistor 91 is coupled to a source of operating voltage by resistor 92. The junction of the collector electrode of transistor 91 and resistor 93 is direct coupled to a terminal A to provide an output terminal for preamplifier 80.

Terminal A is direct coupled to an audio output amplifier 100. Amplifier 100 includes transistors 101, 105 and 106 each having emitter, base, and collector electrodes. The collector electrode of input transistor 101 is coupled by means of a resistor 102 to the source of direct operating voltage +V which is derived from the horizontal deflection circuit 70 in a known manner (for example, by rectification of horizontal deflection flyback pulses). The emitter electrode of transistor 101 is direct coupled to the collector of transistor 105 and the emitter electrode of transistor 105 is direct coupled to ground.

A capacitor 103 is coupled from the junction of the collector electrode of transistor 101 and resistor 102 to one terminal of a loudspeaker 104. The other terminal of loudspeaker 104 is coupled to the junction of the emitter electrode of transistor 101 and the collector electrode of transistor 105.

Bias for transistor 105 is provided by transistor 106, the emitter electrode of which is coupled to the junction of resistor 102 and the collector electrode of transistor 101. Connected between the collector electrode of transistor 106 and the base electrode of transistor 105 is a current limiting resistor 107. Connected between the base electrode of transistor 105 and ground is a resistor 108. The junction of resistors 107 and 108 is direct coupled to the base of transistor 105. The base electrode of transistor 106 is direct coupled to the junction of one terminal of a resistor 111 and the cathode of a diode 110. The other terminal of resistor 111 is coupled to ground. The anode of diode 110 is coupled to the cathode of a diode 109. The anode of diode 109 is coupled to the source of voltage +V.

In operation, the detected signal from sound IF amplifier and detector 25 is amplified and is coupled to audio amplifier 100 by means of preamplifier 80. Preampmlifier 80 increases the input impedance seen by detector 25. The number of transistors and their particular connection is dependent on the desired drive requirement for audio amplifier 100.

The principles of the invention as they relate to amplifier 100 may be practiced with any suitable form of preamplifier 80. Satisfactory operation has been achieved in accordance with the principles of the present invention by connecting terminal A of audio amplifier 100 directly to coupling capacitor 81. Alternatively, a single preamplifier stage was used in accordance with the principles of the present invention by coupling capacitor 81 to the base input terminal of transistor 91.

Audio amplifier 100 is operated in a substantially constant current manner as follows.

The collector-emitter paths of amplifier transistor 101 and transistor 105, the latter serving as a "current sink," are series connected from ground through a resistor 102 to the source of voltage +V derived from the horizontal deflection stage.

The D.C. voltage at the base of transistor 101 is selected equal to one half of the power supply voltage +V by the bias voltage provided from transistor amplifier 91 of preamplifier 80. The current sink transistor 105 draws a substantially constant current $I_O$ which is selected by means of resistor 102 as will be explained more fully below.

Transistor 106 is supplied with base current via resistor 111. The series connected diodes 109, 110 stabilize the base voltage of transistor 106 at the sum of the forward voiltage drops of the diodes ($2V_{be}$) below the source of voltage +V. Where transistor 106 and diodes 110 and 109 are all like devices, the voltage drop across diode 110 is substantially equal to the emitter-base voltage drop of transistor 106. The voltage drop across resistor 102 therefore equals the voltage drop across diode 109. The current $I_O$ is determined by the voltage drop across diode 109 derived by the value of resistor 102. The collector of transistor 106 is a current source which provides the base drive current for transistor 105 via resistor 107. Resistor 107 limits the collector current of transistor 106 and resistor 108 provides a relatively low impedance between the base of transistor 105 and ground.

In the absence of applied audio signals, the current through resistor 102 is split into two currents, of which the first is the main current through the collector-emitter paths of the transistors 101 and 105 to ground and the second current, which is the current through the emitter-collector path of transistor 106 and the base-emitter path of transistor 105 to ground. This latter current is negligible since it amounts to only $I_O$ divided by the $h_{FE}$ of transistor 105.

The current which flows through resistor 102 and the collector-emitter paths of transistors 101 and 105 to ground is sampled across resistor 102 and is held substantially constant by virtue of the path through transistor 106. An increase of $I_O$ results in an increased voltage drop across resistor 102 that causes a decreased drive current through transistor 106 into the base of transistor 105, which in turn decreases the current $I_O$. Similarly, when the voltage drop across resistor 102 decreases due to a decrease in $I_O$ the drive current to the base of transistor 105 is decreased. Thus, a variation in $I_O$ is reflected in the voltage drop across resistor 102 and is compensated by a corresponding base drive change to current sink transistor 105.

Assuming the speaker 104 is not connected to the circuit, and neglecting the current in transistor 106 as mentioned above, the current $I_O$ flows from the operating supply +V through the collector-emitter paths of transistors 101 and 105 to ground independent of the base voltage of transistor 101. When the loudspeaker 104 is connected to the transistor 101 and an audio frequency (A.F.) signal is applied to the base of transistor 101, the substantially constant (D.C.) current $I_O$ is split into the alternating current (A.C.) components $i_1$ through capacitor 103 and the speaker 104, and ($I_O - i_1$) through transistor 101. These alternating current components are added into the collector of current sink transistor 105: $(I_O - i_1) + i_1 = I_0$; it can be seen that the current through transistor 105 is equal to $I_O$ independent of the current $i_1$.

The current $I_O$ is not modulated by $i_1$ because the current through transistor 105 is established at a substantially fixed value by resistor 102, the diodes 109, 110 and transistor 106 and as such is independent of the A.F. signal applied to transistor 101. The current through transistor 101 varies between zero and 2 $I_O$ (when $- i_1 = I_O$) and therefore the signal current through loudspeaker 104 may vary between $+I_O$ and $-I_O$ at the signal (audio frequency) rate.

Amplifier 100 is able to produce a maximum signal current of $I_O$ peak-to-peak independent of the impedance of the loudspeaker 104 and the operating voltage +V (when this voltage is not below the sum of the voltage drop across resistor 102 and the saturation voltages of transistors 101 and 105. This minimum voltage is approximately 1.5 volts.) Therefore, in order to obtain high efficiency with a given value of the operating voltage +V, the value of $I_O$ and the impedance of the loudspeaker 104 — assuming a sufficiently high value of capacitor 103 — preferably is matched such that a maximum signal current ($I_O$ peak-to-peak) the maximum signal voltage swing appears across transistors 101 and 105, respectively. The maximum available signal voltage swing is +V minus the sum of the saturation collector-emitter voltages of transistors 101 and 105 and the voltage drop across resistor 102. Thus, the maximum available signal voltage amplitude amounts to +V minus approximately 1.5 volts (peak-to-peak).

As explained before, the constant current $I_O$ is sampled across resistor 102 and maintained stable by virtue of transistor 106 and diodes 109 and 110. Thermal stability of $I_O$ is achieved by the diodes 109 and 110 in the base circuit of transistor 106. Any ambient temperature increase causes an emitter-base voltage decrease of transistor 106, which would result in an increased $I_O$ current. Since the forward voltage of, for example, a silicon diode changes at about the same amount with temperature as the emitter-base voltage of a silicon transistor diode 110 compensates the emitter-base voltage variations with the temperature of transistor 106, the remaining diode 109 provides a negative temperature coefficient of $I_O$ of approximately 2 parts per 1,000 per degree Centigrade. If the resistor 102 is considered temperature invariant, $I_O$ will decrease slightly with increasing ambient temperature and similarly $I_O$ will increase slightly with decreasing ambient temperature. Such a negative temperature coefficient of $I_O$ is desirable for operation of transistors 101 and 105.

Yet another improvement in the stability of the total current consumption can be achieved by arranging the bias for the base of transistor 101 as shown in the preferred embodiment where the varying base drive current of transistor 101 is also derived through resistor 102.

The following parameters have been employed in a preferred embodiment:

| | | | |
|---|---|---|---|
| Transistors | 84 | BC 147 | NPN 200ma General purpose |
| | 86 | BC 557 | PNP 200ma General purpose |
| | 89 | BC 147 | NPN 200ma General purpose |
| | 91 | BC 557 | PNP 200ma General purpose |
| | 101 | BC 241 | NPN 3 ampere |
| | 105 | BC 241 | NPN 3 ampere |
| | 106 | BC 557 | PNP 200ma General purpose |
| Diodes | 109 | BAX 13 | (IN914) |
| | 110 | BAX 13 | (IN914) |
| Resistors | 82 | 68,000 | ohms ½ watt |
| | 83 | 4,700 | ohms ½ watt |
| | 85 | 1,000 | ohms ½ watt |
| | 87 | 100 | ohms ½ watt |
| | 88 | 1,000 | ohms ½ watt |
| | 90 | 15,000 | ohms ½ watt |
| | 92 | 10 | ohms ½ watt |
| | 93 | 100 | ohms ½ watt |
| | 102 | 1 | ohm 1 watt |
| | 107 | 330 | ohms ½ watt |
| | 108 | 1,500 | ohms ½ watt |
| | 111 | 2,200 | ohms ½ watt |
| Capacitors | 81 | 50 | microfarad 15V |
| | 103 | 1,000 | microfarad 16V |
| Speaker | | 8 | ohms |
| +V | | 15 | volts |

A further advantage is that the illustrated audio amplifier circuit provides short circuit proof operation for the audio amplifier. In case of a short circuit across the speaker terminals, the maximum current can only reach the value of $I_0$ thereby maintaining power dissipation constant.

What is claimed is:

1. An amplifier circuit providing substantially constant current consumption comprising:

a source of direct operating voltage having first and second terminals;

a source of signals to be amplified;

at least first and second transistors having collector-emitter paths series coupled between said first and second terminals of said source of voltage;

utilization means coupled in parallel across said first transistor;

means biasing said second transistor for providing a substantially constant current flow therein, said biasing means including a direct current impedance series connected between said first terminal of said source of voltage and said first transistor; a third transistor having a main conduction path series coupled between the junction of said impedance and said first transistor and at least one resistor connected to said second terminal of said voltage source, said second transistor having a control electrode connected to said main conductor path of said third transistor, said third transistor having a control electrode coupled to a point of reference potential for enabling said third transistor to alter the bias of said second transistor for maintaining said current substantially constant; and means for coupling said source of signals to said first transistor for causing current variations in said first transistor corresponding to said signals, said first transistor current variations producing substantially equal and opposite current variations corresponding to said signals in said utilization means.

2. An amplifier according to claim 1 wherein:

temperature responsive means are coupled between said first terminal of said source of voltage and said point of reference potential.

3. An audio amplifier according to claim 2 wherein:

said temperature responsive means comprises at least one semiconductor junction.

4. In a television receiver wherein auxiliary operating voltages are derived from a deflection circuit of said receiver, an audio amplifier having substantially constant current consumption comprising:

a source of direct voltage having first and second terminals;

a source of audio signals to be amplified;

first and second transistors, each having input, output and common electrodes, said common and output electrodes of said first and second transistors being series connected between said first and second terminals of said source of voltage;

utilization means coupled in parallel across said first transistor;

biasing means coupled to the input electrode of said second transistor for enabling said second transistor to establish a substantially constant current flow therein, said biasing means including a direct current impedance series connected between said first terminal of said source of voltage and said first transistor; a third transistor having a main conduction path series coupled between the junction of said impedance and said first transistor and at least one resistor connected to a second terminal of said voltage source, said second transistor having a control electrode connected to said main conductor path of said third transistor, said third transistor having a control electrode coupled to a point of reference potential for enabling said third transistor to alter the bias of said second transistor for maintaining said current substantially constant; and means for coupling said source of audio signals to said input electrode of said first transistor for causing voltage variations between said output and common electrodes of said first transistor corresponding to said audio signals, said first transistor voltage variations producing output signal variations in said utilization means.

5. An amplifier according to claim 4 wherein:

temperature responsive means are coupled between said first terminal of said source of voltage and said point of reference potential.

6. An audio amplifier according to claim 5 wherein:

said temperature responsive means comprises at least one semiconductor junction.

* * * * *

UNITED STATES PATENT OFFICE
CERTIFICATE OF CORRECTION

PATENT NO. : 3,868,582

DATED : February 25, 1975

INVENTOR(S) : Peter Eduard Haferl

It is certified that error appears in the above-identified patent and that said Letters Patent are hereby corrected as shown below:

Column 3, line 38, that portion reading "derived" should read --divided--.

Signed and sealed this 10th day of June 1975.

(SEAL)
Attest:

RUTH C. MASON
Attesting Officer

C. MARSHALL DANN
Commissioner of Patents
and Trademarks